D. TREMPER.
CAN WASHING APPARATUS.
APPLICATION FILED MAY 12, 1916.
1,198,974.
Patented Sept. 19, 1916.
2 SHEETS—SHEET 1.
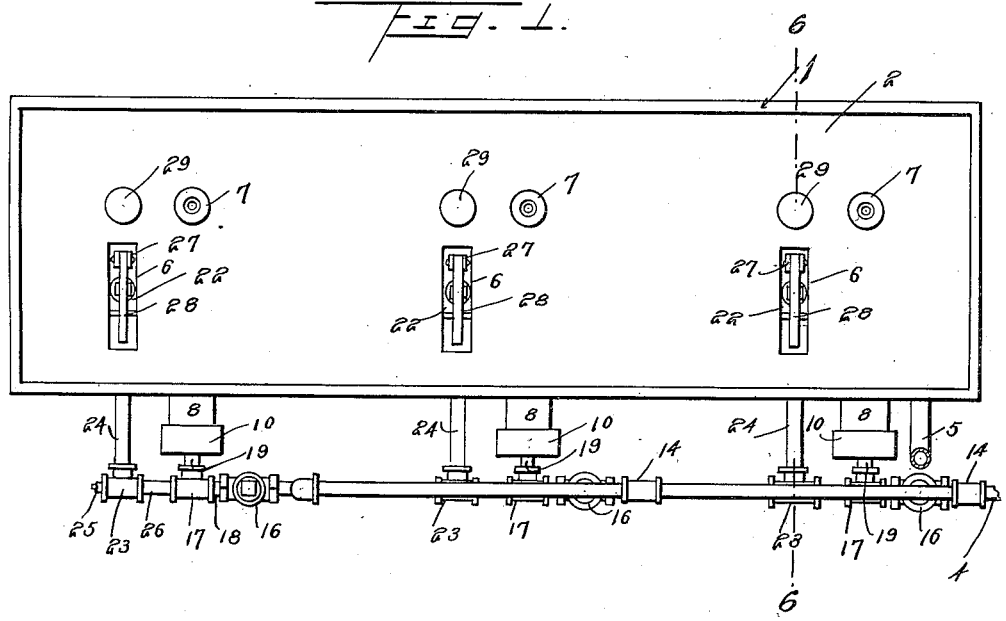
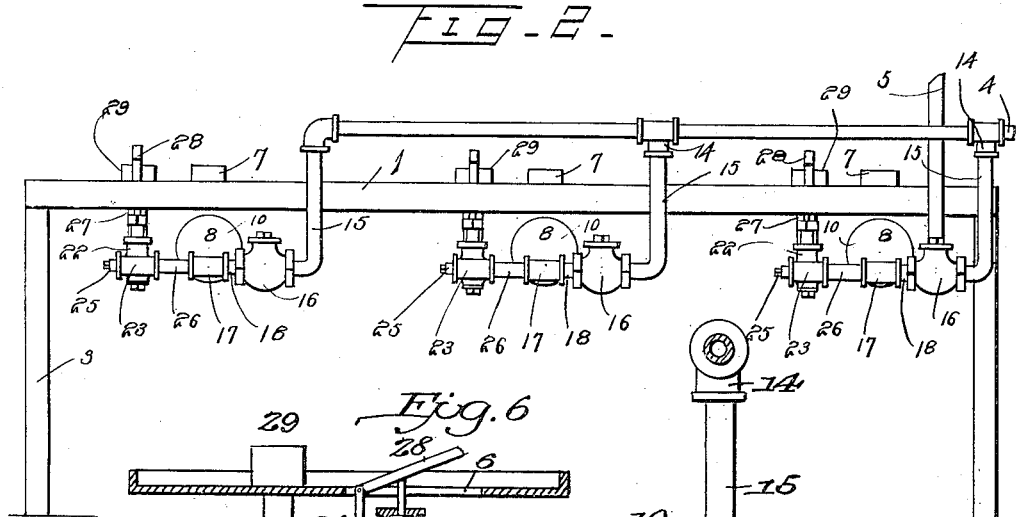
Witnesses
A. Stanton
W. H. Davidson
Inventor
D. Tremper
By
Attorney D. TREMPER.
CAN WASHING APPARATUS.
APPLICATION FILED MAY 12, 1916.
1,198,974.
Patented Sept. 19, 1916.
2 SHEETS—SHEET 2.
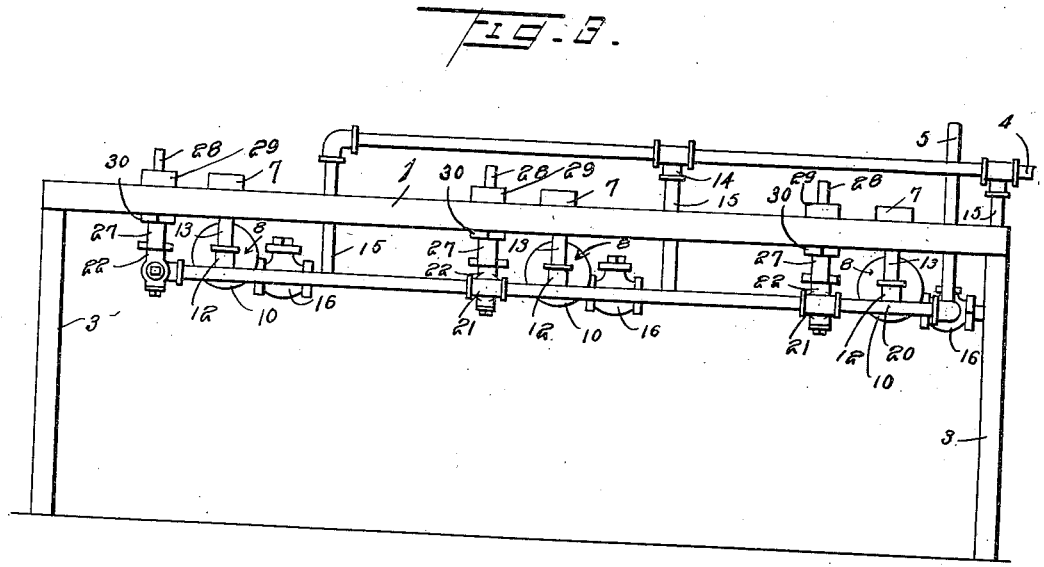
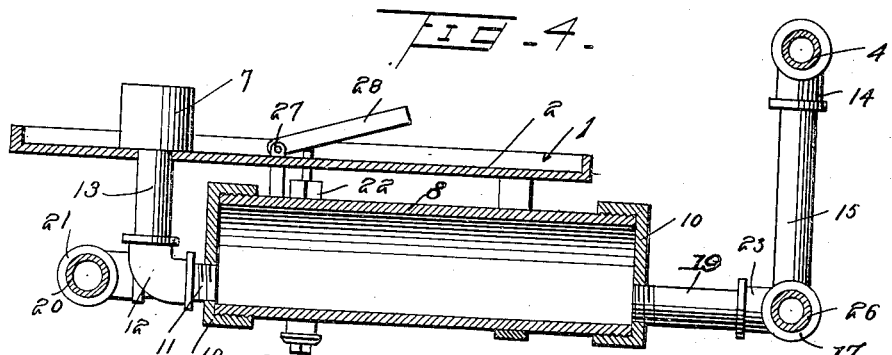
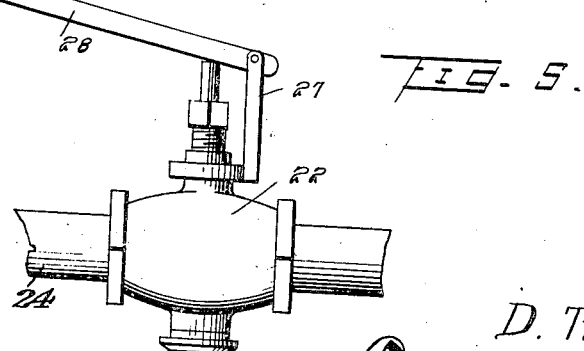
Witnesses
R. Stanton
W. F. Davidson
Inventor
D. Tremper.
By
Attorney

UNITED STATES PATENT OFFICE.

DAVID TREMPER, OF SAVONA, NEW YORK.

CAN-WASHING APPARATUS.

1,198,974.  Specification of Letters Patent.  Patented Sept. 19, 1916.

Application filed May 12, 1916. Serial No. 97,136.

*To all whom it may concern:*

Be it known that I, DAVID TREMPER, a citizen of the United States, residing at Savona, in the county of Steuben and State of New York, have invented certain new and useful Improvements in Can-Washing Apparatus; and I do hereby declare the following to be a full, clear, and exact description of the invention, such as will enable others skilled in the art to which it appertains to make and use the same.

This invention relates to a can washing apparatus and has for its primary object the provision of means whereby a can may be washed and sterilized automatically.

An object of this invention is to provide a table, having means thereon, whereby upon positioning a can on the table, it will be automatically washed and sterilized.

Another object of this invention is to provide a mixing chamber adapted to be connected with a water supply and a steam supply, whereby the water within the mixing chamber will be forced therefrom into the can by the pressure of the steam and after the water within the chamber has been expelled, the steam will enter the can and sterilize same.

A further object of this invention is to provide means within the steam supply, whereby upon positioning the can upon the table, the weight of the can will automatically turn on the steam to the mixing chamber which forces the water therein into the can and which will be followed by steam as long as the can is left upon the table.

A further object of this invention is to provide means within the water supply for cutting off the water to the mixing chamber when the steam is turned on, whereby only the water which is within the mixing chamber will be forced into the can which is of sufficient quantity to wash the can.

A still further object of this invention is the provision of a can washing apparatus of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a top plan view of a can washing apparatus, constructed in accordance with my invention, Fig. 2 is a front elevation of the same, illustrating the water supply, Fig. 3 is a rear elevation illustrating the steam supply, Fig. 4 is a transverse sectional view illustrating the mixing chamber and the connection of the water supply and steam supply therewith, Fig. 5 is a fragmentary side elevation of the means for controlling the steam supply and Fig. 6 is a transverse sectional view taken on the line 6—6 of Fig. 1.

Referring in detail to the drawings, the numeral 1 indicates as an entirety a table consisting of a flat top 2 supported by a plurality of legs 3. This table 1 may be constructed of metal or other suitable material and may be made of any size or length to accommodate washing and sterilizing devices of any number. I have shown the table employing three separate sterilizers and washers which are each operatively connected with a water supply pipe 4 and a steam supply pipe 5. The table top 2 is provided with elongated slots 6 and nozzles 7, which may be of any desired construction. Mixing chambers 8 are secured to the under side of the table top by suitable brackets, adjacent each of the elongated slots 6 and each consists of a cylindrical member 9 having both of its ends closed by detachable caps 10 for receiving water and steam from the water supply pipe and the steam supply pipe, which will be hereinafter more fully described. Secured to one of the detachable caps 10 of the mixing chambers 8 are pipes 11 which are connected to elbows 12 that are in turn connected to pipes 13 which are secured to the nozzles 7.

The water supply pipe 4 may be connected to a water main having a cut off valve therein, (not shown) and extends along the front of the table 1, and has T-couplings 14 therein. The T-couplings 14 have branch pipes 15 connected thereto and depending from the water supply pipe 4. Suitable check valves 16 are connected to the branch pipes 15 and are in turn connected to a T-coupling 17 by means of pipes 18. The T-couplings 17 are connected to pipes 19 which are in turn connected to the other of the detachable caps 10 of the mixing chambers 8 for supplying the mixing chambers with water.

The steam pipe 5 is connected to a suitable steam supply such as a boiler or the like and extends downwardly and under the table 1 to the rear side thereof and is connected to horizontal steam pipe 20 which has T-couplings 21 connected therewith. The T-couplings 21 are connected to branch steam pipes which are in turn connected to self closing valves 22 which may be of any desired type. The valves 22 are connected to T-couplings 23 by means of pipes 24. The T-couplings 23 each have one of their openings closed by a screw plug 25 and have connected therewith branch pipes 26 which are connected to the T-couplings 17 of the water supply pipe.

The self closing valves 22 are provided with vertically extending brackets 27 which have pivoted thereto operating levers 28 which extend upwardly through the elongated slots 6 in the table top 2 of the table and overlie the valve stem of the self-closing valves 22.

The table 1 is provided with openings adjacent the nozzles 7 to receive guide members 29, having nuts 30 secured to their lower ends for retaining the guide members on the table.

In operation, the valve not shown in the water main is turned on allowing the water to pass into the mixing chambers 8 and fill same. The cans to be washed are then placed upon the table upside down, allowing the edges of the cans to surround the nozzles 7 and guide members 29 and rest upon the operating levers 28. The weight of the cans upon the operating levers 28 will cause the levers to move downwardly and open the valves 22 allowing steam to pass into the pipes 26 which are connected to the T-couplings 17 which will cause a back pressure against the check valves 16 and cut off the water supply to the mixing chamber. The pressure of the steam will then be directed against the water within the mixing chambers 8 and force the water therein out through the nozzles 7, washing the cans positioned thereover. As the water within the mixing chambers 8 is forced therefrom, the steam will enter the mixing chambers and pass outwardly through the nozzles 7 and sterilize the cans positioned upon the table.

The flow of the steam through the nozzles 7 will continue as long as the cans are allowed to remain upon the operating levers 28 and thoroughly sterilize the cans. After the cans have become thoroughly sterilized, they are removed from the table and the valves 22 will automatically close being of the self closing type, and will cut off the supply of steam to the mixing chambers. As the supply of steam is cut off from the mixing chambers, the check valves 16 in the branch pipes 15 of the water supply pipe 4 will open and allow the water to flow into the mixing chambers and fill same, thus it will be noted that the process of washing and sterilizing cans is entirely automatic after the cans have been positioned properly upon the table.

While I have shown and described the preferred embodiment of my invention, it will be understood that minor changes in construction, combination and arrangement of parts may be made without departing from the spirit and scope of the invention as claimed.

Having thus described my invention, what I claim is:—

A can washing apparatus comprising a table having an elongated slot therein, a mixing chamber secured to the table, a nozzle mounted on the table and connected to one end of the chamber, a pipe connected to the other end of the chamber, a T-coupling connected to said pipe, a check valve connected to the T-coupling, a water supply pipe connected to the check valve for filling the mixing chamber with water, a steam pipe, a self closing valve connected to the steam pipe and located under the slot of the table, means for connecting the valve to the T-coupling, and a lever connected to the valve and extending through the slot of the table to be engaged by a pan to open the valve to allow steam to close the check valve and cut off the supply of water and force the water within the mixing chamber through the nozzle and followed by steam to wash and sterilize the can.

In testimony whereof I affix my signature in presence of two witnesses.

DAVID TREMPER.

Witnesses:
J. MINER FRENCH,
C. T. HODGE.